Oct. 21, 1947.   A. A. BRASCH   2,429,217
DEVICES FOR TREATMENT OF MATTERS WITH HIGH SPEED ELECTRONS
Filed May 7, 1942   10 Sheets-Sheet 1
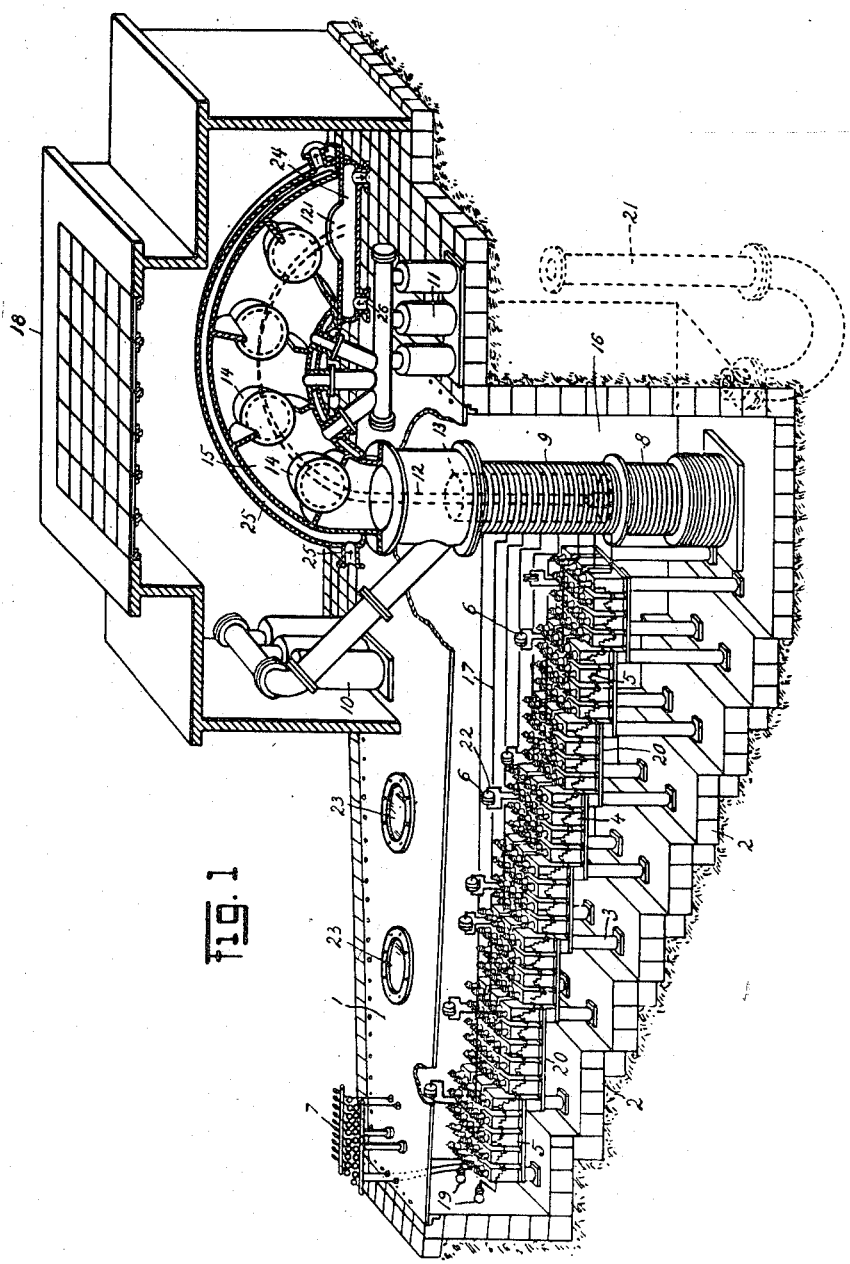
INVENTOR Oct. 21, 1947.  A. A. BRASCH  2,429,217
DEVICES FOR TREATMENT OF MATTERS WITH HIGH SPEED ELECTRONS
Filed May 7, 1942   10 Sheets-Sheet 2
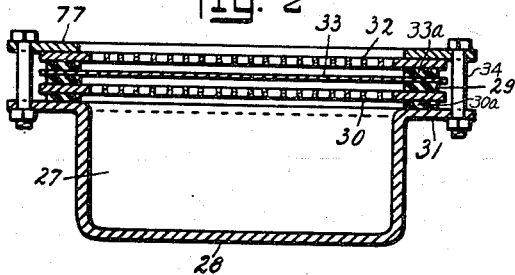
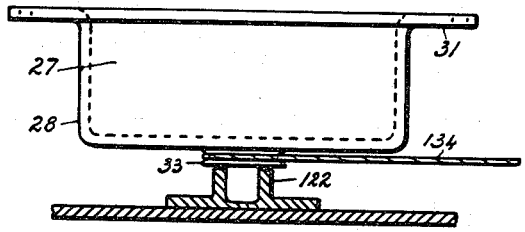
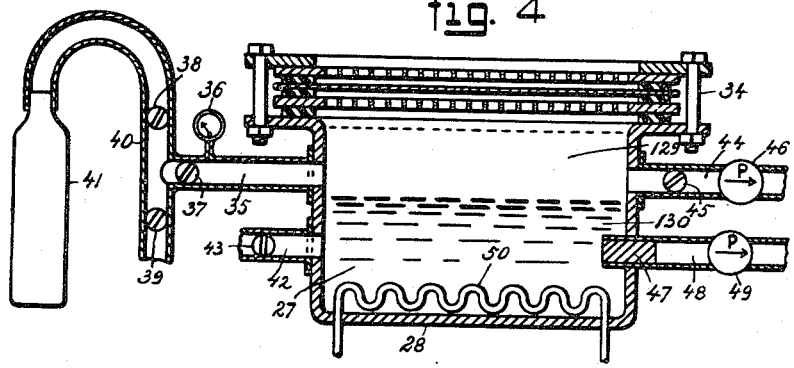
INVENTOR.

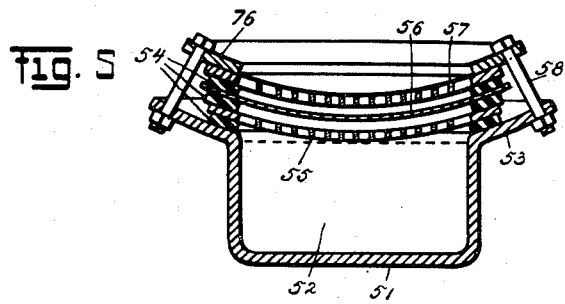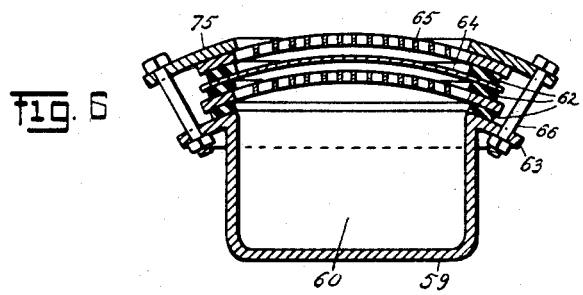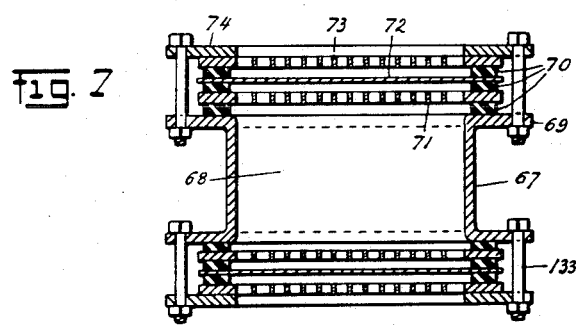

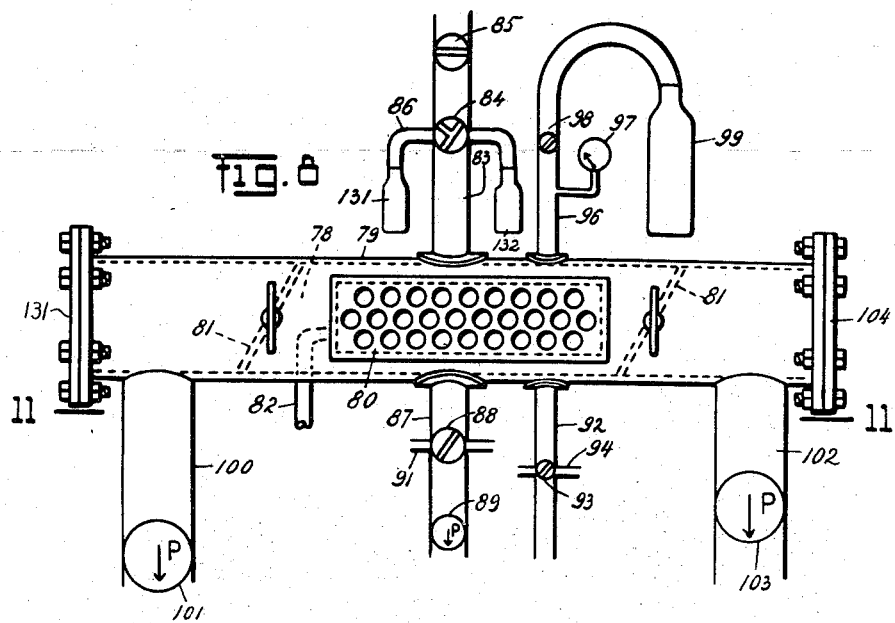
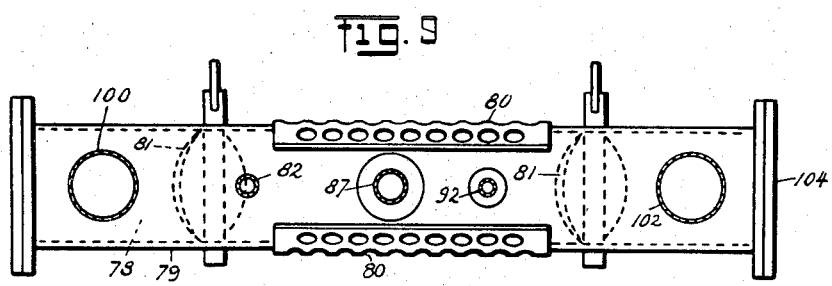

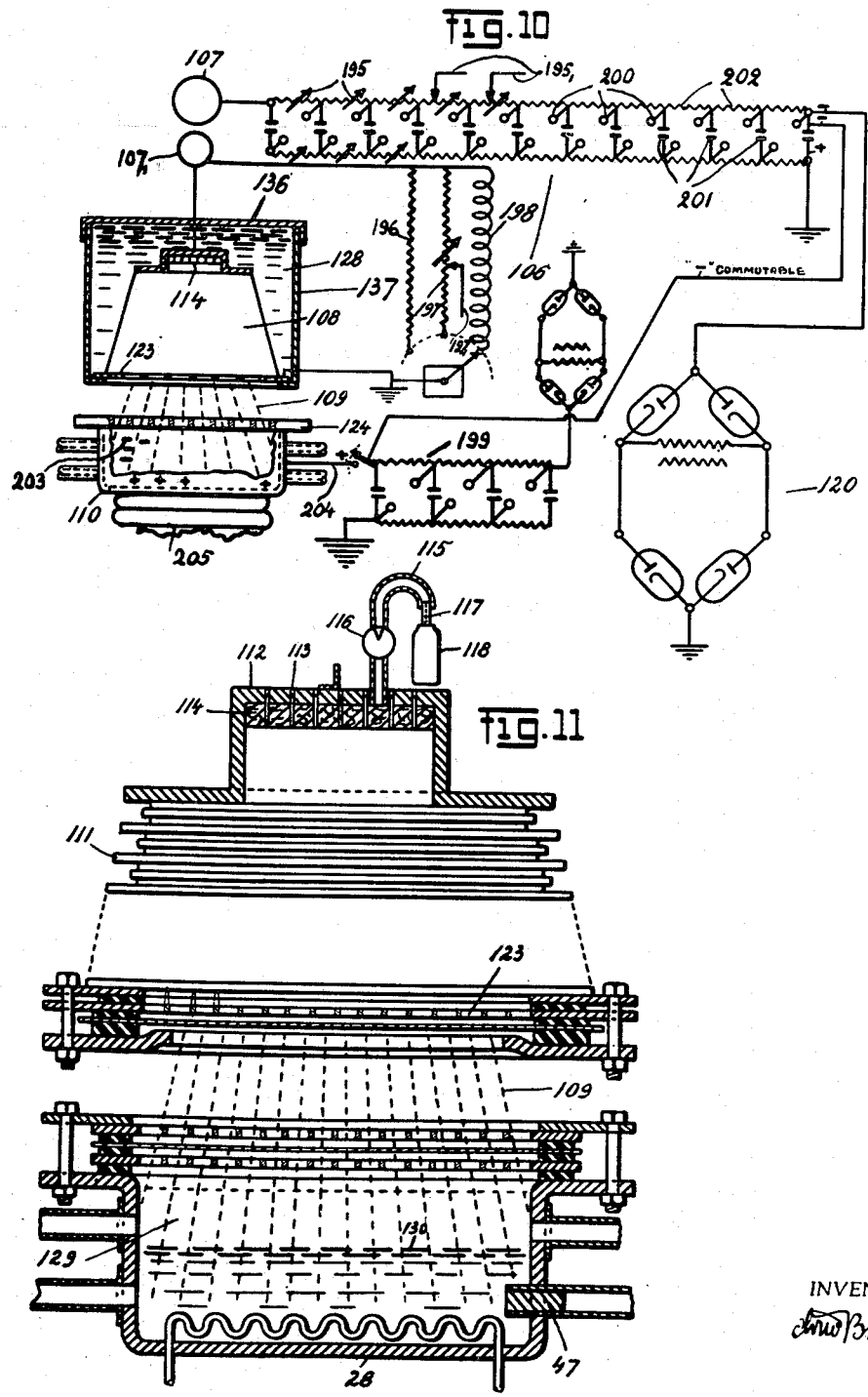

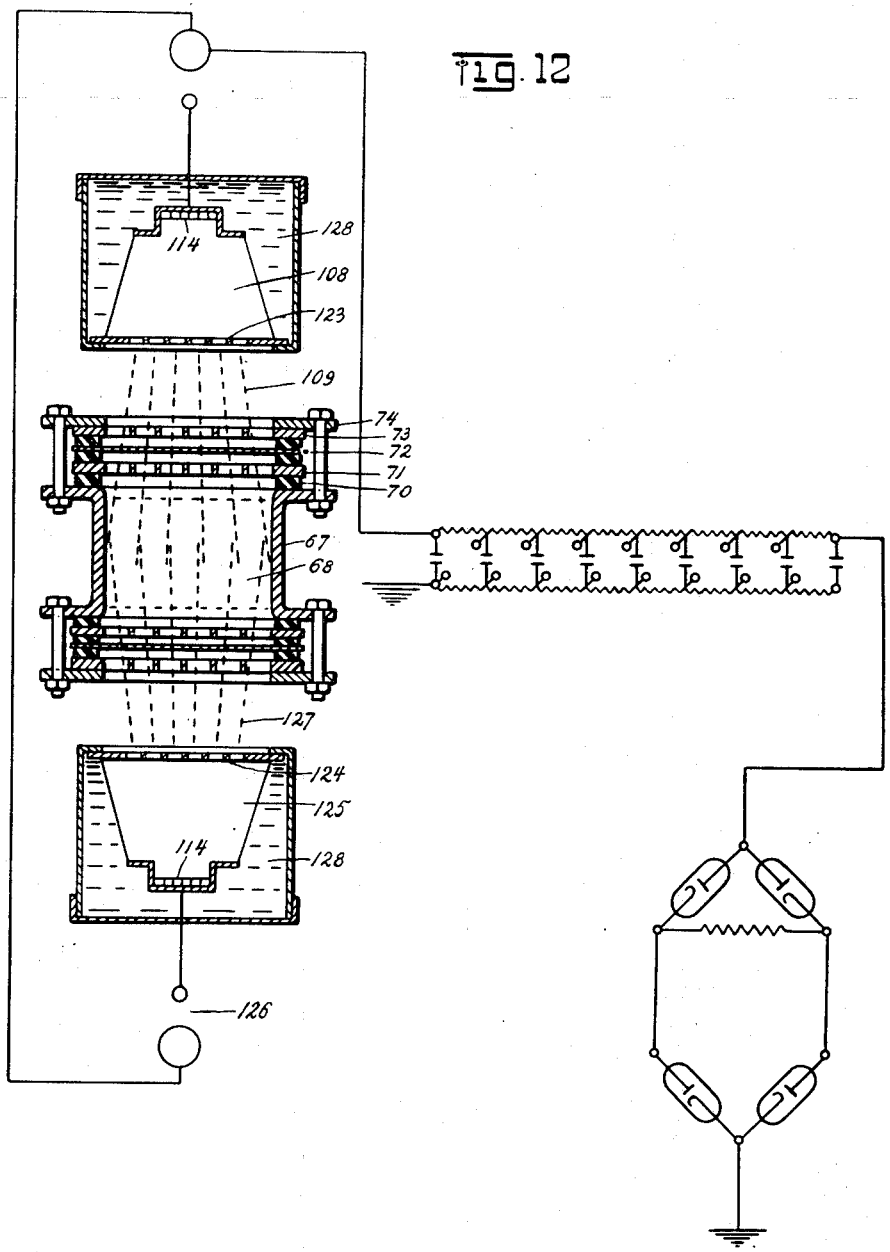

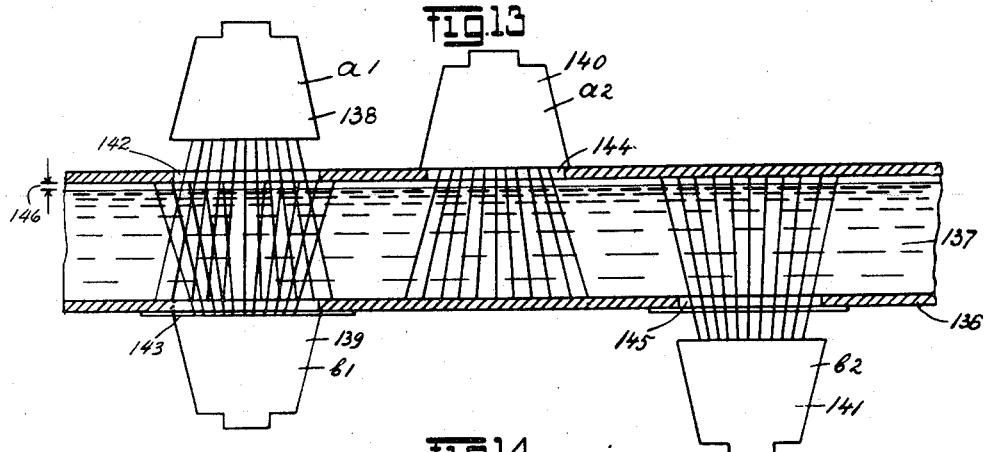
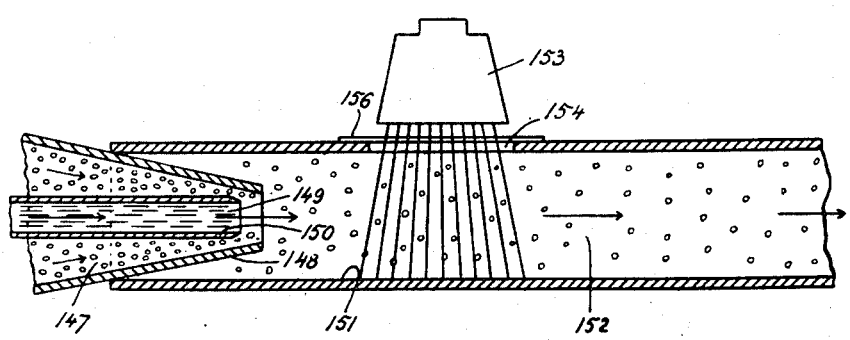
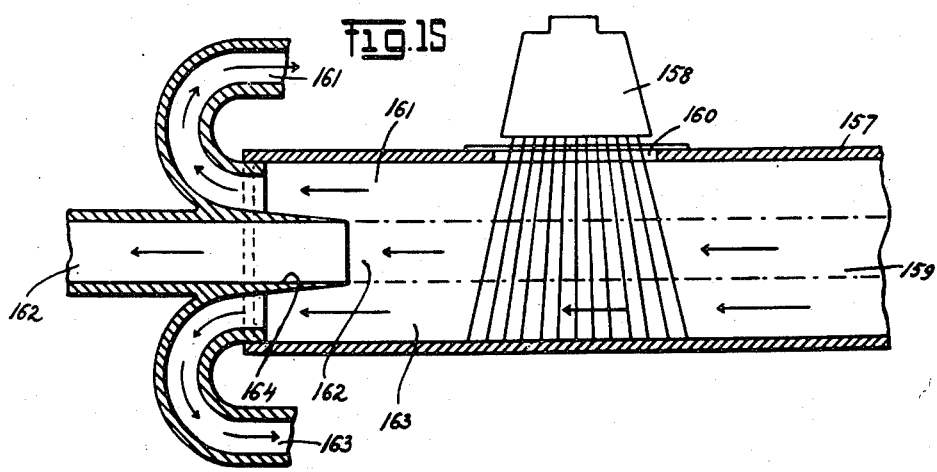

Oct. 21, 1947.  A. A. BRASCH  2,429,217
DEVICES FOR TREATMENT OF MATTERS WITH HIGH SPEED ELECTRONS
Filed May 7, 1942   10 Sheets-Sheet 8

INVENTOR.
Arno Brasch

Oct. 21, 1947.  A. A. BRASCH  2,429,217
DEVICES FOR TREATMENT OF MATTERS WITH HIGH SPEED ELECTRONS
Filed May 7, 1942  10 Sheets-Sheet 9

INVENTOR.

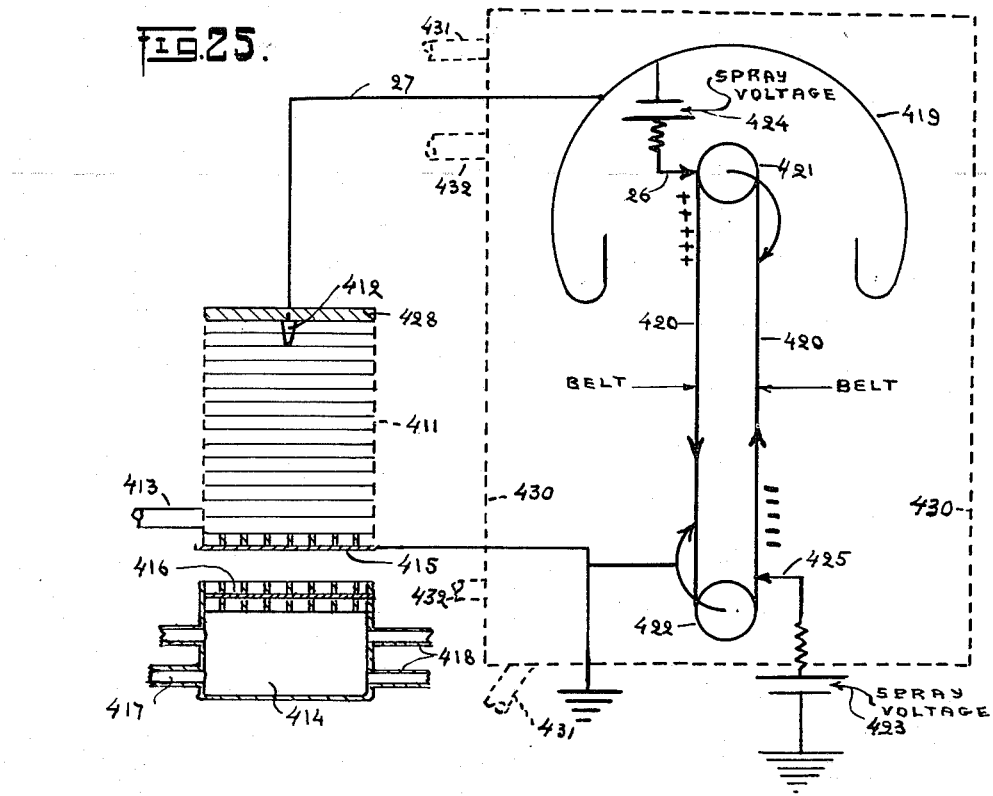
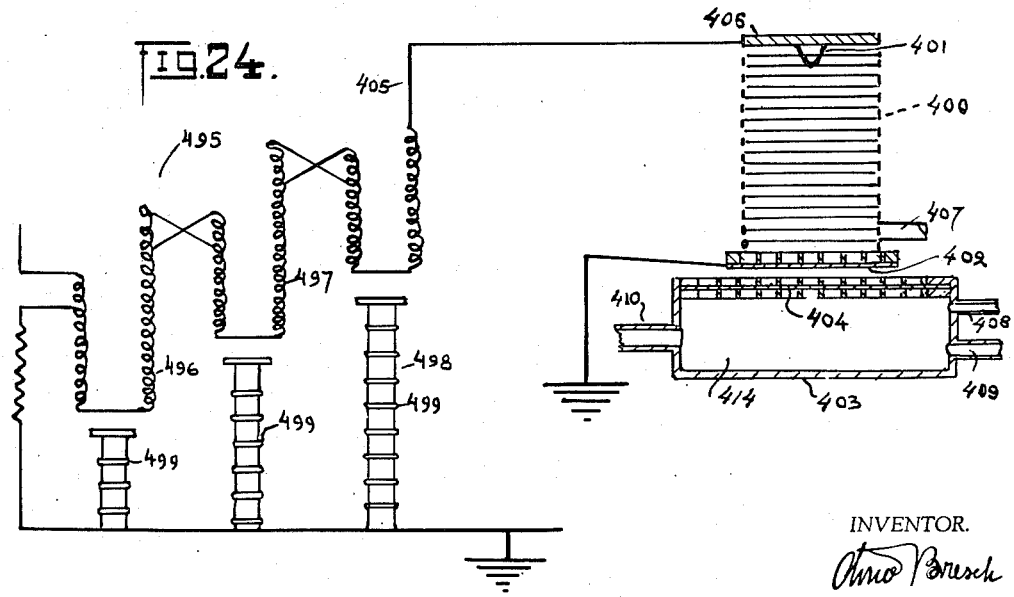

Patented Oct. 21, 1947

2,429,217

UNITED STATES PATENT OFFICE 2,429,217

DEVICE FOR TREATMENT OF MATTERS WITH HIGH-SPEED ELECTRONS

Arno A. Brasch, New York, N. Y., assignor, by direct and mesne assignments, to Electronized Chemicals Corporation, New York, N. Y., a corporation of New York Application May 7, 1942, Serial No. 442,137

43 Claims. (Cl. 250—42)

1

This invention relates to devices for the generation and operation of high-speed corpuscular rays, especially of high-speed electrons or cathode rays on an industrial scale.

Rays produced in the devices herein described may be used negatively or positively charged. If negative-charged corpuscles are generated they may either be used indirectly to produce very intensive and penetrating X-rays, or they may be used to facilitate chemical reactions as described herein. If positive-charged corpuscles are generated, they may be used for chemical reactions in special cases, or preferably, for the production of neutrons in connection with the generation of radio-active substances on a large scale.

This invention furthermore relates to the construction of a new type of impulse generator and a special discharge tube provided for the transformation of high voltages produced by the said generator into useful rays, i. e., a special laminated tube which constitutes one of the main embodiments of this invention. Moreover, this invention provides within this special laminated discharge tube, a high efficiency cathode for the production of emission currents of thousands of amperes within minute fractions of a second.

The generator described herein is provided with special means for safe ignition of the generator spark gaps, also special equipment for shortening the time-element.

It is also the object of this invention to save a considerable percentage of insulating liquids and to this end, the generator in accordance with this invention is constructed in a form specially adapted to accord with the voltage generated therein.

This specification further refers to devices for special anodes to be employed in the manufacture of very intensive X-rays and describes irradiation chambers and accessories in which chemicals are treated with intensive and penetrating rays, especially electronic rays.

It is also an object of this invention to provide special irradiation chambers having special entrance devices and accessories.

The combination of all the components of these devices in accordance with this invention, offers the possibility of producing high-speed electrons on an industrial scale.

The above and further objects and novel features will be more fully apparent from the following detailed description when the same is read in connection with the accompanying drawings. It is to be expressly understood, however, that the drawings are for purposes of illustration only, and are not intended as a definition of the limits of this invention.

In the drawings, wherein like reference characters refer to like parts throughout the several views:

Figure 1 is a schematical view in perspective partly in cross-section of one embodiment of the impulse-generator together with the condenser, battery and laminated tube arrangement, and several other accessories; separate group of ignition spark gaps; a buffer room for electronic rays and a mercury anode.

Figure 2 is a schematical side-view partly in cross-section of one embodiment of an irradiation chamber with ray-entrance device.

Figure 3 is a side-view partly in cross-section of one embodiment of a rotating irradiation chamber.

Figure 4 is a schematical side-view partly in cross-section of one embodiment of an irradiation chamber with ray-entrance device, inlet and outlet means, and other accessory devices.

Figures 5 and 6 are schematical side-views partly in cross-section of another embodiment of an irradiation chamber with ray-entrance device.

Figure 7 is a schematical side-view partly in cross-section of one embodiment of an irradiation chamber with double-entrance device.

Figure 8 is a schematical top-view of another embodiment of an irradiation chamber with accessories.

Figure 9 is a schematical top-view of another embodiment of an irradiation chamber having two entrance devices.

Figure 10 is a schematical side-view of one embodiment of the system comprising a diagram of the impulse-generator and rectifier scheme connected with the discharge-tube, the irradiation chamber and the entrance means; various means for further shortening of the time-element of the main generator; an auxiliary generator.

Figure 11 is a schematical side-view partly in cross-section of one embodiment of a laminated discharge tube with emission cathode ray device; outlet exit device; inlet device and irradiation chamber with accessories including cooler or heater.

Figure 12 is a schematical side-view of a diagram comprising a rectifier scheme, an impulse-generator scheme, 2 discharge tubes, 2 exit-devices for the discharge tubes, a common irradiation chamber with 2 respective entrance devices.

Figure 13 is a schematical side-view of another embodiment of an irradiation container partly in cross-section with several discharge tubes in different positions.

Figure 14 is another embodiment of the irradiation container partly in cross-section for treatment of the gas-atomized substances.

Figure 15 is another schematical embodiment partly in cross-section of an irradiation container with devices for dividing the substance to be treated into layers.

Figure 24 is a diagrammatical representation of the high-voltage transformer device in combination with this invention.

Figure 25 is a diagrammatical representation of the Van de Graaff device in combination with this invention.

Figure 16:
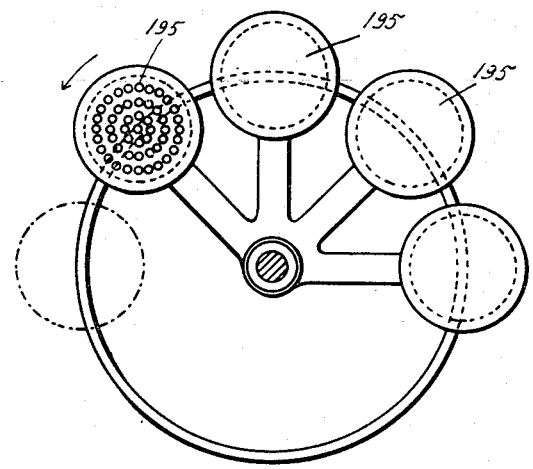
Figures 16 and 17 are schematical top-views of irradiation chambers with interchangeable entrance devices.

Figure 1 shows schematically one aspect of a general execution of an apparatus adapted in accordance with this invention to industrial irradiation purposes, wherein the high-voltage apparatus together with the laminated discharge tube are in a common oil-filled casing. In order to economize on space and oil, the casing, consisting of the metal-lined concrete casing 2 and the metal cover 1, is shaped somewhat like an uneven trapezoid, so that on points of higher voltage, the distance from the grounded walls of the casing widens. The supporting insulators 3 are of different lengths, one longer than the other in accordance with the terrace-shaped structure as shown. For reasons of safety, the cover 2 and the casing 1 are grounded. A plurality of condensers 4 are arranged on the plates 20 which are supported by the various supporting insulators 3 located on the series of platforms. In the case that the plates 20 are metallic, the condensers 4 should be supported by special insulators arranged on these plates. The condensers 4 are charged via charging resistances 5 from the direct current poles 19. The charging in parallel, as shown on Figures 10 and 12, is effected by the compressed gas spark-gaps 6, compressed gas being supplied through the compressed gas conduits 22, and the voltage regulated within the desired limits by the pressure of the said gas. The first group of spark-gaps 7 may be regulated from the outside by means provided therefor, such as, for instance, a handle, in order to assure a safe starting process of the compressed gas spark gaps, and to control the amount of voltage by said outside spark gaps, despite the fact that the electrodes within the chamber 6 are in a fixed position (not shown on the drawing). The electrodes in these chambers may be operated either in compressed gas or in a vacuum, or they may be operated in an insulating fluid preferably noninflammable. This arrangement may be observed through the glass windows 23 on the Figure 1. The windows should be so constructed that they are large enough to admit access for possible repairs of the installation when the oil is removed. Oil may be pumped in and out through pipe 21 provided therefor. A chamber 18 is provided to contain the laboratory and measuring instruments.

The laminated discharge tube 9 is insulated from the ground by the supporting insulator 8 which is also laminated. The electronic rays 12 are generated in the discharge channel 13 and proceed into the buffer room 15 where they are deflected by the magnetic diaphragms 14. The shape and size of the buffer room 15 are chosen to accord with the velocity of the electrons applied and the strength of the magnetic field used for the deflection of the rays which leave through the exit-window 123 as shown on Figures 10, 11, and 12. The discharge tube 9 is evacuated by the vacuum pumps (oil diffusion pumps) 10 and 11.

To avoid deterioriation of the vacuum, the buffer room is also so constructed that the impact of the electrons and the evaporation of the cathode material therewith, will occur as far away as possible from the discharge channel; the gas quantities may be pumped off by another pump 11 provided therefor. A double wall 25 is provided so that the buffer room 15 may be cooled by special methods for the purpose of condensing the occurring gases along the entire path. These gases are caused by the evaporation of the mercury anti-cathode (anode) 24 which may be arranged in place of the exit-window 123 for the generation of X-rays. As normal solid anti-cathodes are soon perforated, the mercury may be renewed again and again through the double-walled casing 121, provided with supply-lines for this purpose. The double-walled casing is made of stainless steel, for instance, or of any other ray and mercury-resistant material.

A constant flow of mercury is brought about in such a way that the mercury is kept in motion by means of pump 26 and fed from a large mercury reservoir provided therefor, without the admission of atmospheric air. This reservoir, because of the relatively large quantity of mercury stored therein, represents in itself an efficient cooling system for most purposes, but for better cooling, it may be combined with special cooling radiators made of a good heat-conducting material such as copper which can be air or water-cooled. The mercury can also be cooled off by a special refrigeration method, if desired. This cooling and continuous flow of new mercury and the thereby achieved regeneration of the mercury anti-cathode are essential for the continuous operation of the described apparatus.

As stated, the buffer-room arrangement 15 with diaphragms 14, exit-window 123, mercury pump 26 and mercury anode 24, made in accordance with this invention, is for use only when either very high electronic intensities are to be controlled, or when the generated electrons which have been deflected in the buffer-room 15 do not leave through the exit-window 123.

For direct electronic irradiation purposes, the electrons 12 generated in the discharge tube 9 penetrate directly into the open and into the irradiation chamber. For this purpose, the exit-window 123 is connected with a metal annular end-plate provided adjacent to the exit-window shown in Figure 12.

It is necessary that special attention be paid to the chambers in which the materials to be irradiated are treated with high-speed electrons of the character described herein. As, on the one hand, in order to exert the necessary atmospheric pressures and/or subsequent vacuum (or in vice versa order), the walls of the irradiation chamber must be comparatively thick, and on the other hand, care must be taken that the electrons expend their action (i. e. their energy) not on the wall of the irradiation chamber but, appropriately, in the material (substance) to be irradiated, special constructions are provided to serve this problem. The cover of these irradiation chambers are so made that they consist, preferably, but not obligatorily, of thin foils which absorb the rays only slightly. Aluminum may be used for the material of the foils, but since it evaporates with time when very high electronic intensities are applied, thin discs of graphite or carbon impregnated with suitable material to make them substantially air-tight, will be found more advantageous, in many cases.

Where pressure or vacuum is employed, the thin discs above recommended for the foils will be destroyed in a very short time, especially if a thickness not exceeding $\frac{1}{10}$ to $\frac{1}{2}$ mm., hence a special method described herein may be applied, to wit:

It is a well-known physical principle that even thin materials can sustain considerable variations in pressure when their surfaces are reduced. This principle has long been applied in the manufacture of exit-windows for special scientific purposes, and, in a corresponding modification—an entrance-window—can be applied to the foils described above, viz: on a top-plate preferably made of metal provided with as many openings as possible is placed a thin foil and made air-tight by the insertion of a thin gasket ring made of any suitable material, as, for instance, rubber, cork, or any soft metal. If metal is used, it may be welded or soldered to the top-plate, in which case the gasket may be omitted. If desired, a suitable glue may also be used to fasten the thin foil to the top-plate, and the top-plate may be fastened to the irradiation chamber either by means of a gasket or by soldering or welding. If desired, the top-plate, foil and irradiation chamber may constitute one single piece. The perforations in the top-plate may cover only a part of the surface, or, if desired, may cover the entire surface save for the edges thereof.

If vacuum prevails in the chamber, a construction such as this prevents the foil from being sucked into the irradiation chamber, no matter how great the diameter of the entrance device may be, provided that the size of each individual perforation of the top-plate is predetermined to prevent such a break-through of the foil.

However, in view of the fact that the perforations in the top-plate necessarily weaken its tensile strength, it (the top-plate) must be of such a thickness that it will withstand all the pressure required. To this end, three factors must be taken into consideration: (1) the vacuum or pressure required; (2) the diameter of the irradiation chamber; and (3) the number and size of the apertures in the perforated top-plate.

Another aspect of this invention is shown on Figure 2 wherein a combination window system is provided to use the same perforated top-plate arrangement for both eventualities—pressure and vacuum. The thin foil 33 through which the electrons penetrate into the substance to be irradiated is supported above and below by thick-walled perforated plates 77 provided with as many openings as possible. Stainless steel will prove very advantageous for these perforated supporters, whereas materials such as copper and brass are destroyed by evaporation too readily. In the figure 28 is the casing; 27 the inner space of the irradiation chamber; 31 the shoulder of the chamber; 29 the rubber gaskets; 33 the thin foil; 32 the perforated supporter plates; 77 the metallic annular end-plates; and 34 the bolts which, in combination with the gaskets, serve to compress the arrangement and make it air-tight. The gaskets 33a and 30a employed between foil 33 and perforated plate 32, or foil 33 and perforated plate 30 must be so thin that the elasticity of the foil material will be always sufficient to prevent breaking of the foil.

Another aspect of this invention is shown on Figure 3 wherein the entire irradiation chamber is constructed to rotate around the shaft 122 by means of the disk 33 and the driving belt 134. This is for the purpose of effecting a better mixture of the substances to be irradiated.

On Figure 4 is shown another aspect of this invention, wherein an irradiation chamber similar to the one illustrated on Figure 2 is provided with facilities for introducing the necessary chemical admixtures. Where the substances to be irradiated are liquid or semi-liquid, entrance is made through the inlet pipe 42 into the irradiation chamber, and finally into the absorption filter 47 which may be made of platinum or palladium sponge, or of any other suitable material, and is located in the exit pipe 48. Upon completion of the treatment, the liquid or semi-liquid substances are drawn off by the pump arrangement 49. The stop-valve 43 is provided to regulate the flow of the liquid. Gases such as nitrogen, inert gases, hydrogen, chlorine, etc., may be conveyed from the gas bomb 41 through pipe 40 via stop-valve 38 and 37 into the irradiation chamber 27. The manometer 36 makes the reading of the prevailing pressure possible. The gases may be removed through the outlet valve 39 which is provided therefore. If evaporation is necessary, the inlet valve 37 is closed and the air pressure prevailing in space 129 is lowered by the pump device 46. The regulating valve 45 may be opened or closed as needed.

To cool or heat the substances to be irradiated to a certain predetermined degree, the device 50 is provided, as shown on the drawing.

Figure 5 shows an irradiation chamber with a convex ray-entrance device, i. e. the combination of the perforated plate or plates, the foil, the gaskets (if any), and the annular end-plate which, in combination with a bolt, compresses the whole entrance system, in order to make the system in itself, together with the other parts of the irradiation chamber, air-tight. The ray-entrance device as shown follows the same principle as illustrated in Figures 2 and 4. However, in order to better distribute the weight of the vacuum or pressure used inside of the irradiation chamber, foil 55, the perforated plates 57, the gaskets 54, the annular end-plate 76 and the shoulder 53 of the irradiation chamber 51, are convex-shaped. The bolt 58 in connection with the conically-bent annular end-plate 76 is provided to make the arrangement air-tight.

Figure 6 shows the entrance-window in a concave form. The concave foil 64 is supported by the concave perforated plates 65; the rubber rings 62 are provided to assure tightness. The arrangement rests on the shoulder 63 provided therefor and is fastened with the aid of bolts 66 to the correspondingly-shaped concave end-plates 75.

It is comparatively easier to produce doubled amperages than doubled voltages. A doubling of the intensity increases the price of the installation 50%, whereas a doubling of the voltage increases it by 400%. Hence, methods have been sought to attain the greatest penetration depth with a comparatively low voltage, but until this invention, nothing has been accomplished in this direction.

This invention provides an irradiation chamber which simultaneously permits an irradiation from both ends, thereby attaining the greatest penetration depth with comparatively low voltage. Two discharge tubes are used simultaneously, as shown on Figure 12. The irradiation chamber corresponds to the general development of the apparatus shown on Figure 2, but it is provided on the other end with a ray-entrance device such as described herein. All the irradiation chambers described in this specification are provided with necessary connections for treatment of chemicals, such as shown on Figure 4, but have been partly omitted in subsequent figures in order to afford a better view of the apparatuses.

On Figure 7, 67 designates the chamber walling; 68 the inner space of the chamber; 69 the shoulder of the chamber; 70 the tightening gasket rings; 71 and 73 the perforated plates; 72 the thin foil; 74 the annular end-plate; and 130 the bolts for tightening the ray-entrance device. The gaskets employed between the foils and perforated plates must be sufficiently thin so that the elasticity of the foil material will be adequate to prevent its breaking.

In chemical mass production, it will be found convenient to place the substances to be irradiated in tubular containers and to irradiate them through an entrance device of tubular shape so as to preserve the tubular form of the unit.

Figure 8 shows such a chamber in the form of a tube 79 as seen from above. 80 designates the combination ray-entrance device for the high-speed electrons.

The liquids and semi-liquids, together with, if necessary, the solid substances to be irradiated in accordance with this invention, are introduced at the one end 131 of tube 79 and taken out at any desired place provided therefore, i. e. for example, at the other end 104 of this tube. If, however, the apparatus made in the form of a tube continues tubularly at 104 and 131, the substances may be introduced through pipe 100 and drawn out through pipe 102 by means of the pump device 103 provided therefor, or vice versa. Valves 81 are provided for the closing of the irradiation chamber. The conduit 96 leads to the manometer 97 and over the regulating valve 98 to the gas bomb 99. Suitable catalysts, if desired, may be introduced via the inlet-pipe 100 as well as via the other inlet devices provided for the purpose. The prevailing gas pressure may be removed through the discharge tube 92 and the closing valve 93 connected with the outlet supporters 94. The substance in irradiation chamber 78 may be evacuated through the pipe 87 with the aid of the vacuum pump 89. Through the inlet pipe 83, bridged by the three-way valve 84, various gas mixtures may be optionally introduced through the inlet pipes 86 and fed by the gas bombs 132. The gases may flow out through the outlet-valve 85.

Figure 9 follows the general delineation of Figure 8 with the sole difference that the ray-entrance device affords the possibility of simultaneous irradiation from two opposite sides. 80 designates the two ray-entrance windows in this figure.

Another aspect of this invention is shown on Figure 10 wherein a general view of the irradiation installation is presented diagrammatically. The apparatus 120 which generates high voltage direct current, charges the multiple condenser circuits of the impulse generator 106. The resulting high voltage is a function of the number of condenser circuits installed. The frequency of the impulses and therefore the intensity of the impulse generator 106 depends on the size of the condensers and the current output of the rectifier apparatus 120. If the output of rectifier is sufficiently great, then the intensity of the impulse generator can be practically unlimited.

The voltage reaches the discharge tube 108 via the main spark gap 107 at the impulse moment. The electrons generated in the cathode device 114 are accelerated in the laminated discharge tube 108 and penetrate into the open through the exit-window 123. The rays 109 enter the combination ray-entrance device 124 into the irradiation chamber 110.

Another aspect of this invention is shown on Figure 11, wherein a metallic chamber 112 in which a rather large quantity of glasswool 114 or similar material, is arranged. Metal points 113 pass through this glasswool 114 and come into conductive connection with the metal chamber 112. The glasswool itself, or in connection with the metal points, brings about the liberation of very strong Lilienfeld effects. This unusually strong electronic emission is engendered by the infinite number of points and threads of the glasswool (or similar material), loosely connected with each other, together with a strong electrical field—between cathode and anode many 1000 kvs.—and, if desired, also assisted by an auxiliary electrical field which can be fed by a special, small impulse generator which supplies, for example, a few 100 kvs., and operates in the same phase simultaneously with the main impulse generator for the purpose of generating extremely strong quantities of electrons out of the glasswool material. During the impulse moment, very high electronic intensities, amounting to many thousands of amps., are liberated.

The emission effect is especially strong when a small amount of gases, such as, for instance, hydrogen, oxygen, nitrogen, or even inert gases, are conducted into the glass-wool or like material. It is a known fact that a relatively great quantity of air is occluded in the surface of the glass-wool or like material. During the electrical impulses, quantities of these gases are dissolved and become a part of the discharge. After a number of impulses, the glass-wool (or like material) becomes degassed gradually, whereupon the emission grows automatically weaker. Therefore, it is advantageous to add a suitable gas or gas mixture to the glasswool 114, which may be conducted therein by the inlet pipe 115 from the gas container. The amount of the gas mixture is controlled by the needle valve 117. Valve 116 is provided to open or shut the entire pipe line.

Experiments performed with this invention in this connection have also brought to light that it is possible to impregnate the glasswool with materials which liberate gases if exposed to an electrical discharge of sufficient voltage and intensities. This eliminates the necessity of having a special gas container from which to conduct the gases into the glasswool or similar material. The materials referred to above which liberate gases may be paraffin which liberates hydrogen or any like substance. A few drops of such a substance, appropriately placed in the glasswool or mingled therewith, or placed adjacent to the metal points 113, will give off an amount of gases that will be found adequate even in a continuous operation, i. e. for an unlimited amount of impulses.

Another advantageous aspect of this method for operation of the emission cathode is to have the glasswool sufficiently cooled to about 100–150° C. for the purpose of freezing some gases fed by a special pipe into the glasswool.

The electrons 109 emitted from the cathode, as shown on Figures 10 and 11, are accelerated in the laminated discharge tube 111, leave through exit-window 123 and penetrate into the irradiation chamber 129. This chamber 129 is partially filled with the liquid, semi-liquid or solid substance 130 to be irradiated and left partially empty in order that, if so desired, gases, catalysers or other chemicals, may be conducted therein through pipes provided therefor, as shown on Figure 4, at 35 and 44. These pipes are also provided for the purpose of evacuating the irradiation chamber.

Another aspect of this invention is shown on Figure 12 wherein an irradiation chamber in accordance with that presented on Figure 7 is simultaneously irradiated by two discharge tubes, 108 and 125, placed on opposite sides of the chamber, and in which the two beam cones 127 and 109 overlap each other in the center of the irradiation chamber in order to assure sufficient electronic intensity at all points inside thereof.

The impulse-generator provides the required high voltage for both tubes 108 and 125, or for a plurality of tubes if desired, in a manner known per se, i. e. over the main spark gaps 126 to the tubes 108 and 125. The beam cones (electrons) 109 and 127 leave by the exit-windows 123 and 124 respectively; 128 designates the oil-filled casings; 68 the inner space of the irradiation chamber; 67 the walls of the chamber; 74 designates the shoulder of the chamber, and 70, 71, 72 and 73 represent the various components of the ray entrance device.

Another aspect of this invention is shown on Figure 13. This is a special arrangement of the irradiation chamber 136 wherein the substance to be irradiated 137 moves in the irradiation chamber for purposes of treatment by high-speed electrons and is subjected simultaneously to the action of several cathode-ray beam-cones emitted from the several discharge tubes 138, 139, 140 and 141 provided for the purpose.

Devices 142, 143, 144 and 145 may be provided in the chamber for the purpose of easy access of the rays (as unabsorbed as possible) therein. In the case that no atmospheric pressure or vacuum is applied within the chamber, simple openings may be provided in lieu of these devices, thereby making it unnecessary to place membranes, foils or screens between the discharge tube and the substance to be treated. This may be done in every case where membranes or entrance devices are referred to in this application or illustrated on the drawings, if found appropriate and desirable.

Where the entrance 142 or 144 directly contacts the electronic source, the distance 146 between the level of the moving substance 137 and the exit-window of the electronic source (discharge tube) may be made as small as desired.

Another object of this invention is shown on Figure 14, wherein is an apparatus for the purpose of atomizing the substance or substances to be irradiated by atmospheric air or gas of any kind under a predetermined pressure. This is accomplished by means of an injector 148 into which is introduced gas or air 147 under the predetermined pressure. The substance (or substances, as they may be) such as fluid, powder, or paste, are passed (at the same time, before or after) into the mixing or irradiation chamber 151 via an appropriately placed second injector 150. This second injector may be placed opposite the first injector 148, or both injectors 148 and 150 may be placed on the same side of the irradiation chamber. The atomized substances 152 then stream through the cone of the cathode rays at a predetermined velocity. Every particle of this atomized substance is irradiated by the source of electrons 153 through a ray-entrance device which may be either an opening 154, a membrane 156 of any character described herein, or the ray-entrance device of the character delineated in this specification.

An arrangement such as this produces a very effective and efficient irradiation, as these minute particles or small drops of liquid, under the steady pressure of the gas or air 147 continue to move within the chamber in a constant eddying and whirling motion, now approaching the highest point of the electronic emission and now the lowest point. Thus, absolute equal intensity of irradiation is achieved through the substance.

More than one source of electrons 153 may be provided for the electronic treatment of such atomized substance, as shown, for instance, on Figures 13, 16, 17 and 18.

It is obvious that the velocity of electrons is reduced while they traverse a matter (or substance) due to collisions with molecules and atoms. Therefore, to compensate for undesirable differences in the distribution of velocities of electrons, the matter may be subjected simultaneously or in series to various sources of electrons, irradiated from different discharge tubes and from different directions, if desired. One simple example is shown on Figures 7, 12 and 13, wherein the electrons act on the substances to be treated from two oppositely-placed electronic sources.

On Figure 15 is shown another embodiment of the irradiation container 157 provided with one or more sources of electrons (one source only, 158, is shown). The substance 159 flows in and through the beam cone which penetrates through the entrance 160 and thereafter becomes divided into more than one layer; for instance, into three layers 161, 162 and 163, by separating guide-means provided therefor, 164. Thus, the substance 159 becomes divided into three layers, for example. Due to the fact that electronic velocity is higher when close to the exit-window and reaches zero at the end of its predetermined range, depending upon the voltage used, these three given layers, 161, 162 and 163 will thus be irradiated by different intensities; i. e. layer 161 will be more strongly irradiated than 162 and layer 162 will be more strongly irradiated than 163.

Homogeneous treatment may thus also be obtained by using the layer 162 for instance, while the other layers 162 and 163 will be reconducted into the irradiation chamber by the said guide means 164, once or several times and re-mix with the substance 159 therein.

On Figure 16 is shown a device providing several openings or entrance devices 195, so mounted that if one should go out of order or should be changed for any reason, any one of the others may be used without interrupting the operation.

Figure 17:
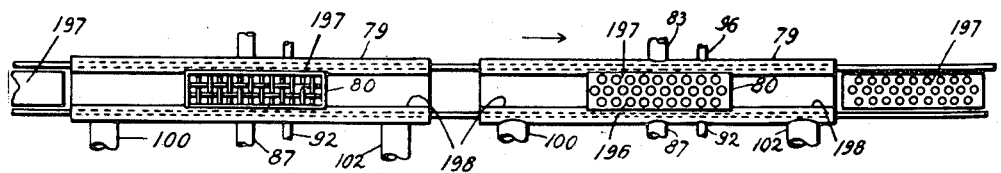

Figure 17 depicts another embodiment of a device similar to that demonstrated on Figure 16 wherein several entrance devices, such as membranes, foils or screens 196 may be mounted on suitable guides 198, for instance, a track, for use when desired. For example, the membrane 197 may replace device 196.

Figure 18:
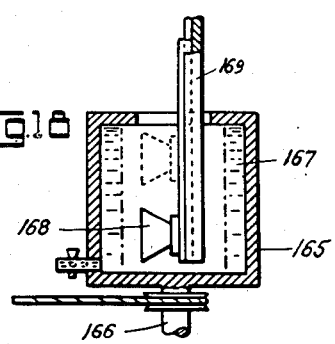
Figures 18 and 19 are schematical side-views partly in cross-section of a rotating irradiation container with discharge tubes and entrance-devices.

Figure 18 represents an embodiment of a rotating container 165 mounted on a shaft 166 driven by a motor over a suitable transmission belt or other means. The container is filled with a substance, i. e. fluid, gaseous or pasty substance, powder, etc., 167 and while rotated, the substance being subjected to the action of centrifugal force, remains for a predetermined length of time as a layer around the inside of the container.

Several sources producing electrons of the character described herein may be provided outside or inside of the container. For instance, source 168 may be provided inside the container and mounted rigidly or slideably on a support. If slideably mounted, it may be moved during the rotation either to and fro or in any plane, sliding on guide-means provided therefor. The substance, after the conclusion of the treatment, is thus homogeneously irradiated and ready for use.

Wherever, in this application, it is stipulated that the matter or substance is in movement, or displacement in one or more planes with respect to the source of electrons, such movement or displacement may also be provided by keeping the matter in a fixed position with respect to the ground, but moving the source of electrons in one or more planes.

Figure 19:
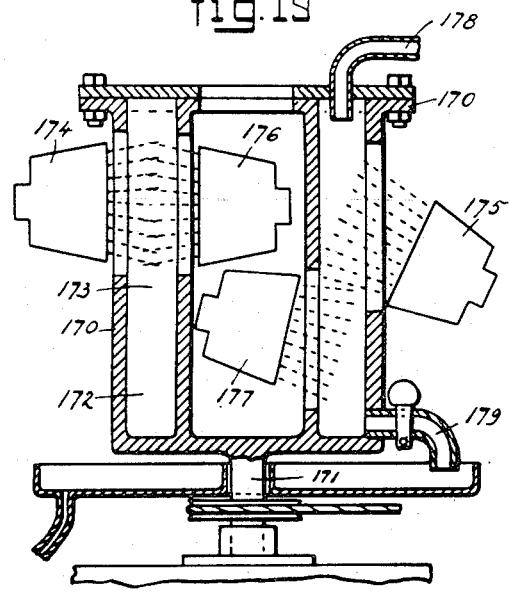
Figure 20:
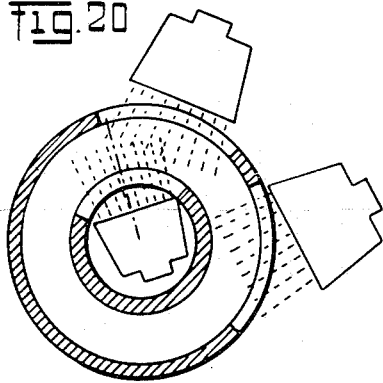
Figure 20 is a cross-sectional view of Figure 19.

Figures 19 and 20 show another embodiment of rotating irradiation container 170 mounted on a rotating shaft 171. The container has a cylindrical compartment 172 formed by the outer and inner walls of the container, into which compartment the substance 173 is placed. Entrance windows may be provided in the outside or inside walls, and one electron source or one for each window, 174, 175, 176, 177, may be employed. Control of the impact angle in any plane may be provided by suitable means. Control of the time-element during which the electrons exercise their irradiation action may be additionally checked by the input pressure through the supply pipe 178 or through the dimensioning of the outlet pipe and the valve 179 or vice versa. If the liquid is fed into the container through the pipe 179, it exits through the pipe 178.

Figure 21:
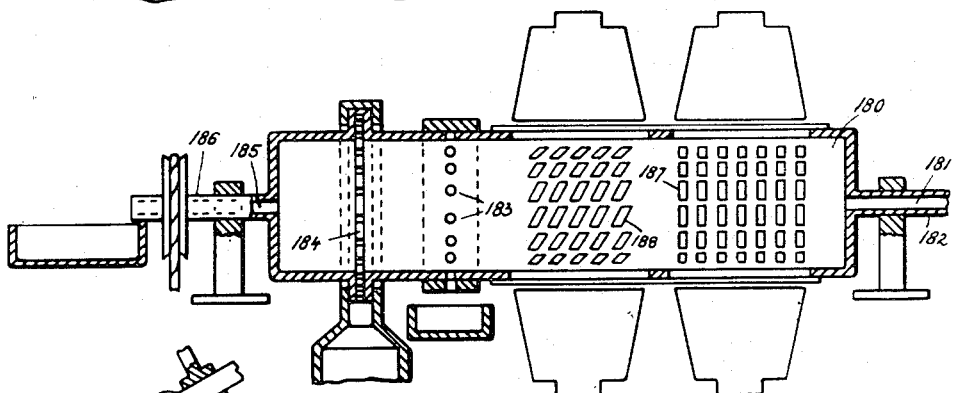
Figure 21 is a schematical side-view partly in cross-section of a rotating irradiation container with discharge tubes and entrance-devices.

Figure 21 depicts horizontal rotating container 180 into which the substance is fed through the inlet pipe 181 which may be mounted in the shaft 182.

The outlet of the substance may proceed either through openings 183 or a slot 184 provided accordingly, and assisted by suitable bushings to prevent the flowing out of the liquid in undesirable directions. The outlet may also occur through the pipe 185 provided in the interior of the shaft 186.

The entrance openings for the electrons may be variously shaped, for instance, as represented by 187 and 188 on the drawing.

Figure 22:
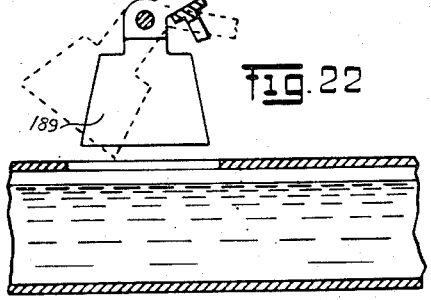
Figure 22 is a schematical side-view partly in cross-section of an irradiation container provided with a pivotal electron source.

Figure 22 represents an electronic source 189 provided with means to control the impact angle of the electrons with respect to the level of the material or substance subjected to their action by suitable means provided therefor; for instance, pivoting the source of electrons in one or more planes.

Figure 23:
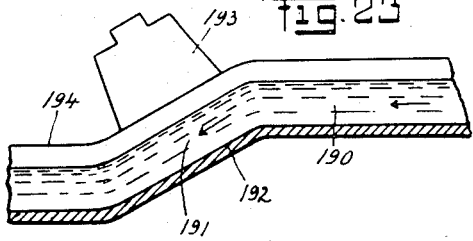
Figure 23 is a schematical side-view of another embodiment of an irradiation chamber with discharge tube.

Figure 23 represents another embodiment of this invention for the treatment of layers of substances 190 which are fed into the irradiation chamber, such layers having a predetermined thickness 191 particularly applicable in the treatment of fluids. An embodiment such as this consists of guiding planes 192 mounted on different levels with respect to the ground and inter-connected by an inclined guiding plane. As these layers pass through the electronic sources 193 and 194, for instance, they are subjected to the predetermined irradiation.

Figure 24 shows the transformer set 495; the individual transformers 496, 497 and 498, for instance; the insulating supporters 499—499—499; the laminated vacuum discharge tube 400; the cathode 401; the exit window 402; the radiation chamber 403 and the entrance window with the bilateral grille-support 404. A metallic conductor 405 conveys the high-voltage transformed in the transformers 496, 497 and 498 to the negative pole 406 of the laminated vacuum discharge tube 400; 408, 409 and 410 are pipes through which the materials or gases are introduced into the chamber 403 and removed therefrom after irradiation.

The discharge tube and its combination with the radiation chamber, pumping equipment, etc., are described fully throughout this application.

Figure 25 shows diagrammatically a combination of this invention with the Van de Graaff generator, wherein the laminated vacuum discharge tube in accordance with this invention is 411; the cathode device is 412; the pipe leading to the pump is 413; the radiation chamber is 414; the exit window is 415; the entrance window with bilateral grille-support is 416; and the inlet and outlet pipes are 417 and 418. The dome of the Van de Graaff generator is 419. A continuous belt made of insulating material 420 rolls over rollers 421 and 422. Two D. C. apparatuses producing approximately 10,000 volt current each, by way of example, are provided, which, by means of sprayer devices 425 and 426, spray a negative or positive charge, as desired, against the belt 420. A metallic connection 427 conducts the D. C. voltage collected in the dome 419 to the negative pole 428 of the laminated discharge tube 411 in accordance with this invention. The entire generator may be placed in a tank as shown on the figure by 430 in broken lines, having one or more outlets and inlets 431 and 432 for the introduction of gases or air or evacuation thereof. These pipes may be connected to an appropriate pumping equipment. The belt together with the dome 419 may be operated in vacuum to avoid corona losses or instead of evacuating the tank, high atmospheric pressure can be introduced therein, such as nitrogen. Evacuation or over-pressure work toward the same end, namely, the avoidance of corona losses, and offer the possibility of constructing such electrostatic generators in a compact size.

Another embodiment and object of this invention comprises devices and methods whereby the substance to be treated will be exposed to one or many extremely short impulses produced by the discharging of condenser units.

On Figure 10 of this specification is shown schematically three different circuits. Variation I comprises the impulse generator 106, the rectifier device 120, the main spark gap 107—107, the discharge tube 108, the oil-filled casing 128, the exit-window 123, the ray beams 109, the irradiation chamber 110, and the ray-entrance device 124. In this circuit, a number of spark gaps 200 are provided to discharge in series the condensers or capacitors 201 which are charged in parallel by means of the charging resistors 202 (only a few are shown on the drawing).

The circuit of variation 2 is the above circuit with the additional provision of means for the purpose of shortening the time-element of each single impulse, the said means comprising variable charging resistors so constructed as to be able to diminish the ohm resistance of the circuit. Instead of ohm resistors, there may also be variable induction resistors. Means are also provided in this circuit to shunt the discharge tube between the points 107 and 109. Such shunting means may be either a constant resistor 196, or a variable resistor or the induction coil 198, which may itself be constant or variable.

The third circuit on the drawing may be used in addition to either of the above two circuits, having a separate voltage source 199 of comparatively high tension with predetermined positive polarity, to charge the wall of the irradiation chamber 110 which in this case must be metallic with a positive potential.

The first two circuits are provided for the reason that upon the size of the capacitors 201 and the ohm or induction resistance of the charging resistors 202 or 195 (or a combination of both), and to a certain degree, upon all the other elements of these two circuits, such as the spark gaps, etc., mainly depends the duration of each single high-voltage impulse, i. e. the time element is controlled thereby. Taking away, by means of the resistors of low ohmage, those parts of the impulse wave which have a long duration, and selecting only those parts of the impulse wave that are of sufficiently short duration, only a comparatively small fraction of the entire intensity of the impulse wave is naturally utilized. To compensate for the removed energy, the capacitors 201 and the charging equipment 120 must be adequately dimensioned so that a very high initial amount of current will be provided.

Without entering into too many details of theoretical calculation of common knowledge, it may be stated that the above time element is normally within the order of $10^{-5}$ to $10^{-6}$ sec. The above embodiments also permit the further shortening of this time to $10^{-7}$ sec. or even less.

To control the voltage existing in the irradiated substance between the poles 203 and the container 110, a separate source of voltage 199 may be provided. This may be either an impulse generator working in synchronization with the main generator 106 but generating for this purpose a positive impulse which is conducted to the walls of the irradiation chamber 110 by closing the switch 204, or it may be by a continuous voltage of predetermined intensity.

Figure 10 also shows another use for the said separate voltage source 199, which in this case, is an auxiliary impulse generator of smaller size and smaller voltage than the main generator 106. Instead of using it to conduct the positive polarity to the metallic walls of the irradiation chamber 110, it may be used to start the ignition of the spark gaps 200 of the main generator 106. The electrodes of these spark gaps are in a fixed position, and as pointed out before, the regulation of the spark gaps takes place by means of this auxiliary generator. The connection of the auxiliary impulse generator 199 to the metal wall 110 of the irradiation chamber is switched off by means of the switch connection 204. This auxiliary generator is then charged in the negative and the negative impulse is conducted to the negative pole of the first spark gap of the main impulse generator 106, thereby starting the ignition of the spark gaps 200.

Without touching the spark gaps of the main generator, ignition of these spark gaps may be effected to any degree desired simply by connecting the shock impulse of the auxiliary generator to the spark gap circuit of the main generator.

Having now ascertained and particularly described the nature of the said invention and the manner in which it is applied, I declare that what I claim is:

1. A generator comprising a plurality of condensers, charging resistors, spark gaps and a discharge tube, said condensers, said charging resistors, said spark gaps and said discharge tube being placed in a container, filled with a non-inflammable liquid insulating material, said discharge tube being laminated, said container being so shaped that at the points of lower voltage the distance between the edges of the said generator and the walls of the said container is smaller than the distance between the edges of the said generator and the walls of the said container at the points of higher voltage.

2. A generator comprising a plurality of condensers, charging resistors, spark gaps and a discharge tube, said condensers, said charging resistors, said spark gaps and said discharge tube being placed in a container filled with a liquid insulating material, said discharge tube being laminated, said container being shaped in accordance with the increase of the voltage, whereby the container takes the shape of an uneven trapezoid.

3. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window in the wall of said irradiation chamber arranged in the path of said high speed electrons emitted by said irradiation unit through said electron permeable exit window, thus permitting entrance of said high speed electrons through said electron permeable entrance window into said irradiation chamber; at least one opening in the wall of said irradiation chamber for introducing into said irradiation chamber said substance to be irradiated by said high speed electrons; at least one opening in the wall of said irradiation chamber for introducing into said irradiation chamber at least one material adapted to act upon said substance to be irradiated by said high speed electrons during irradiation of the same; and means adapted to heat said substance to be irradiated by said high speed electrons during irradiation of the same.

4. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window in the wall of said irradiation chamber arranged in the path of said high speed electrons emitted by said irradiation unit through said electron permeable exit window, thus permitting entrance of said high speed electrons through said electron permeable entrance window into said irradiation chamber; at least one opening in the wall of said irradiation chamber for introducing into said irradiation chamber said substance to be irradiated by said high speed electrons; at least one opening in the wall of said irradiation chamber for introducing into said irradiation chamber at least one material adapted to act upon said substance to be irradiated by said high speed electrons during irradiation of the same; and means for cooling said substance to be irradiated by said high speed electrons during irradiation of the same.

5. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; at least one opening in the wall of said irradiation chamber for introducing into said irradiation chamber said substance to be irradiated by said high speed electrons; and means adapted to change the temperature of said substance to be irradiated by said high speed electrons.

6. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; at least one opening in the wall of said irradiation chamber for introducing into said irradiation chamber said substance to be irradiated by said high speed electrons; and means adapted to heat said substance to be irradiated by said high speed electrons during irradiation of the same in said irradiation chamber.

7. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; at least one opening in the wall of said irradiation chamber for introducing into said irradiation chamber said substance to be irradiated by said high speed electrons; and means adapted to cool said substance to be irradiated by said high speed electrons during irradiation of the same in said irradiation chamber.

8. A device for subjecting a substance to irradiation with high speed electrons comprising in combination at least one irradiation unit provided with an electron permeable exit window for the high speed electrons created within said irradiation unit; an electrical accelerator including a Van de Graaff generator for accelerating the velocity of the electrons to a high speed; an irradiation chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

9. A device for subjecting a substance to irradiation with high speed electrons comprising in combination at least one irradiation unit provided with an electron permeable exit window for the high speed electrons created within said irradiation unit; an electrical accelerator including a Van de Graaff generator working in a vacuum for accelerating the velocity of the electrons to a high speed; an irradiation chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

10. A device for subjecting a substance to irradiation with high speed electrons comprising in combination at least one irradiation unit provided with an electron permeable exit window for the high speed electrons created within said irradiation unit; an electrical accelerator including a Van de Graaff generator operated under compressed gases for accelerating the velocity of the electrons to a high speed; an irradiation chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

11. A device for subjecting a substance to irradiation with high speed electrons comprising in combination at least one irradiation unit provided with an electron permeable exit window for the high speed electrons created within said irradiation unit; an electrical accelerator including a high voltage transformer for accelerating the velocity of the electrons to a high speed; an irradiation chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

12. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and means for moving said irradiation chamber in respect to said irradiation unit.

13. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and a pumping device connected with said irradiation chamber for moving said substance to be irradiated by said high speed electrons within said irradiation chamber.

14. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and means for moving said substance to be irradiated by said high speed electrons within said irradiation chamber during irradiation of the same by high speed electrons.

15. A device for subjecting a substance to irradiation with high speed electrons comprising in combination at least one irradiation unit provided with an electron permeable exit window for the high speed electrons created within said irradiation unit; an electrical accelerator for accelerating the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and an injector pump adapted to inject said substance to be irradiated by said high speed electrons under pressure into said irradiation chamber.

16. A device for subjecting a substance to irradiation with high speed electrons comprising in combination at least one irradiation unit provided with an electron permeable exit window for the high speed electrons created within said irradiation unit; an electrical accelerator for accelerating the velocity of the electrons created within said irradiation unit to a high speed; a centrifuge type irradiation chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

17. A device for subjecting a substance to irradiation with high speed electrons comprising in combination at least one irradiation unit provided with an electron permeable exit window for the high speed electrons created within said irradiation unit; an electrical accelerator for accelerating the velocity of the electrons created within said irradiation unit to a high speed; a centrifuge type irradiation chamber having the shape of a cylindrical double wall chamber the outer and inner walls of which are interconnected at least at one end thereof, said irradiation chamber serving for holding the substance to be irradiated by said high speed electrons and arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

18. A device for subjecting a substance to irradiation with high speed electrons comprising in combination at least one irradiation unit provided with an electron permeable exit window including a membrane consisting of coal and permitting the high speed electrons created within said irradiation unit to pass through said electron permeable exit window; an electrical accelerator for accelerating the velocity of the electrons to a high speed; an irradiaton chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

19. A device for subjecting a substance to irradiation with high speed electrons comprising in combination at least one irradiation unit provided with an electron permeable exit window including a membrane consisting of graphite and permitting the high speed electrons created within said irradiation unit to pass through said electron permeable exit window; an electrical accelerator for accelerating the velocity of the electrons to a high speed; an irradiation chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

20. A device for subjecting a substance to irradiation with high speed electrons comprising in combination at least one irradiation unit provided with an electron permeable exit window for the high speed electrons created within said irradiation unit; an electrical accelerator for accelerating the velocity of the electrons to a high speed; an irradiation chamber for said substance to be irradiated by said high speed electrons arranged outside of said irradiation unit adjacent to said exit window of the same; and an electron permeable entrance window including a membrane consisting of coal provided in the wall of said irradiation chamber and arranged in the path of said high speed electrons emitted by said irradiation unit through said electron permeable exit window, thus permitting entrance of high speed electrons through said electron permeable entrance window into said irradiation chamber.

21. A device for subjecting a substance to irradiation with high speed electrons comprising in combination at least one irradiation unit provided with an electron permeable exit window for the high speed electrons created within said irradiation unit; an electrical accelerator for accelerating the velocity of the electrons to a high speed; an irradiation chamber for said substance to be irradiated by said high speed electrons arranged outside of said irradiation unit adjacent to said exit window of the same; and an electron permeable entrance window including a membrane consisting of graphite provided in the wall of said irradiation chamber and arranged in the path of said high speed electrons emitted by said irradiation unit through said electron permeable exit window, thus permitting entrance of said high speed electrons through said electron permeable entrance window into said irradiation chamber.

22. A device for subjecting a substance to irradiation with high speed electrons comprising in combination at least one electrical accelerator; at least one electron discharge vessel provided with electron emitting means arranged therein and adapted to transform the electrical voltages and intensities produced by said electrical accelerator into at least one beam of high speed electrons; at least one electron permeable exit window provided in said electron discharge vessel permitting the high speed electrons created within said electron discharge vessel to penetrate outside of said electron discharge vessel; an irradiation chamber for said substance to be irradiated by said high speed electrons arranged outside of said electron discharge vessel adjacent to said electron permeable exit window of the same; an electron permeable entrance window arranged in the wall of said irradiation chamber in the path of said high speed electrons emitted by said electron discharge vessel through said electron permeable exit window, thus permitting entrance of said high speed electrons through said electron permeable entrance window into said irradiation chamber; and means for rotating said irradiation chamber during entrance of said high speed electrons through said electron permeable entrance window so that said substance to be irradiated by said high speed electrons is homogeneously irradiated by the same.

23. A device for subjecting a substance to irradiation with high speed electrons comprising in combination at least one electrical accelerator, at least one electron discharge vessel provided with electron emitting means arranged therein and adapted to transform the electrical voltages and intensities produced by said electrical accelerator into at least one beam of high speed electrons; at least one electron permeable exit window provided in said electron discharge vessel permitting the high speed electrons created within said electron discharge vessel to penetrate outside of said electron discharge vessel; an irradiation chamber for said substance to be irradiated by said high speed electrons arranged outside of said electron discharge vessel adjacent to said electron permeable exit window of the same; an electron permeable entrance window arranged in the wall of said irradiation chamber in the path of said high speed electrons emitted by said electron discharge vessel through said electron permeable exit window, thus permitting entrance of said high speed electrons through said electron permeable entrance window into said irradiation chamber, and means for moving said substance to be irradiated by said high speed electrons within said irradiation chamber during irradiation of the same.

24. A device for subjecting a substance to irradiation with high speed electrons comprising in combination at least one electrical accelerator; at least one electron discharge vessel provided with electron emitting means arranged therein and adapted to transform the electrical voltages and intensities produced by said electrical accelerator into at least one beam of high speed electrons; at least one electron permeable exit window provided in said electron discharge vessel permitting the high speed electrons created within said electron discharge vessel to penetrate outside of said electron discharge vessel; an irradiation chamber for said substance to be irradiated by said high speed electrons arranged outside of said electron discharge vessel adjacent to said electron permeable exit window of the same; an electron permeable entrance window consisting of a thin membrane arranged in the wall of said irradiation chamber in the path of said high speed electrons emitted by said electron discharge vessel through said electron permeable exit window; and two grill-like supports one on each side of said thin membrane supporting the same.

25. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; and an electron permeable entrance window having a concave shape and composed of a thin foil of an electron permeable material supported by at least one grill-like support, said electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

26. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and means for introducing into said irradiation chamber at least one inert gas.

27. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and pump means for at least partly evacuating said irradiation chamber.

28. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and means for moving said irradiation unit with respect to said irradiation chamber and said electron permeable entrance window in the wall of the same.

29. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; means for moving said substance to be irradiated by said high speed electrons within said irradiation chamber; and means for dividing said substance after irradiation into at least two layers being at different distances from said electron permeable entrance window and for separately removing each of said layers.

30. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; a tubular irradiation chamber for said substance to be irradiated, said tubular irradiation chamber having an outer and an inner cylindrical wall and arranged so that said irradiation unit is located within the cylindrical space formed by said inner wall of said irradiation chamber; and an electron permeable entrance window arranged in said inner wall of said irradiation chamber in the path of said high speed electrons emitted by said irradiation unit through said electron permeable exit window, thus permitting entrance of said high speed electrons through said electron permeable entrance window into said irradiation chamber.

31. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; a tubular irradiation chamber for said substance to be irradiated, said tubular irradiation chamber having an outer and an inner cylindrical wall and arranged so that said irradiation unit is located within the cylindrical space formed by said inner wall of said irradiation chamber; an electron permeable entrance window arranged in said inner wall of said irradiation chamber in the path of said high speed electrons emitted by said irradiation unit through said electron permeable exit window, thus permitting entrance of said high speed electrons through said electron permeable entrance window into said irradiation chamber; and means for rotating said tubular irradiation chamber about its axis.

32. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; at least one opening in the wall of said irradiation chamber for introducing into said irradiation chamber said substance to be irradiated by said high speed electrons; at least one opening in the wall of said irradiation chamber for removing from said irradiation chamber said substance after irradiation of the same by said high speed electrons; means adapted to change the temperature of said substance to be irradiated by said high speed electrons; means for introducing into said irradiation chamber at least one gas under pressure; and means for indicating the gas pressure within said irradiation chamber.

33. A device for subjecting a substance to irradiation with high speed electrons comprising in combination at least one irradiation unit provided with an electron permeable exit window for the high speed electrons created within said irradiation unit; an electrical accelerator to accelerate the velocity of the electrons to a high speed; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; at least one opening in the wall of said irradiation chamber for introducing into said irradiation chamber said substance to be irradiated by said high speed electrons; at least one opening in the wall of said irradiation chamber for removing from said irradiation chamber said substance after irradiation of the same by said high speed electrons; means adapted to change the temperature of said substance to be irradiated by said high speed electrons; means for introducing into said irradiation chamber at least one gas under pressure; means for indicating the gas pressure within said irradiation chamber; means for moving said substance to be irradiated by said high speed electrons within said irradiation chamber; and means for dividing said substance after irradiation into at least two layers being at different distances from said electron permeable entrance window and for separately removing each of said layers.

34. A device for subjecting a substance to irradiation with high speed electrons comprising in combination at least one electrical accelerator; at least one electron discharge vessel provided with electron emitting means arranged therein and adapted to transform the electrical voltages and intensities produced by said electrical accelerator into at least one beam of high speed electrons; at least one electron permeable exit window provided in said electron discharge vessel permitting the high speed electrons created within said electron discharge vessel to penetrate outside of said electron discharge vessel; an irradiation chamber for said substance to be irradiated by said high speed electrons arranged outside of said electron discharge vessel adjacent to said electron permeable exit window of the same; an electron permeable entrance window arranged in the wall of said irradiation chamber in the path of said high speed electrons emitted by said electron discharge vessel through said electron permeable exit window, thus permitting entrance of said high speed electrons through said electron permeable entrance window into said irradiation chamber; at least one opening in the wall of said irradiation chamber for introducing into said irradiation chamber said substance to be irradiated by said high speed electrons; at least one opening in the wall of said irradiation chamber for removing from said irradiation chamber said substance after irradiation of the same by said high speed electrons; means adapted to change the temperature of said substance to be irradiated by said high speed electrons; means for introducing into said irradiation chamber at least one gas under pressure; means for indicating the gas pressure within said irradiation chamber; means for moving said substance to be irradiated by said high speed electrons within said irradiation chamber; and means for dividing said substance after irradiation into at least two layers being at different distances from said electron permeable entrance window and for separately removing each of said layers.

35. A device for subjecting a substance to irradiation with high speed electrons comprising in combination at least one irradiation unit provided with an electron permeable exit window for the high speed electrons created within said irradiation unit; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; an inlet opening in the wall of said irradiation chamber for introducing into said irradiation chamber said substance to be irradiated by said high speed electrons; an outlet opening in the wall of said irradiation chamber for removing from said irradiation chamber said substance to be irradiated by said high speed electrons after irradiation of the same; and an electrical accelerator for accelerating the velocity of the electrons to a high speed, said electrical accelerator including a surge generator comprising in combination a container filled with an insulating liquid, a plurality of condensers, charging resistors and a first set of spark gaps arranged within said container immersed in said insulating liquid within the same, a second set of spark gaps arranged outside of said container, and adjustable means for regulating said second set of spark gaps, controlling thereby the voltage output of said surge generator.

36. A device for subjecting a substance to irradiation with high speed electrons comprising in combination at least one irradiation unit provided with an electron permeable exit window for the high speed electrons created within said irradiation unit; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; an inlet opening in the wall of said irradiation chamber for introducing into said irradiation chamber said substance to be irradiated by said high speed electrons; an outlet opening in the wall of said irradiation chamber for removing from said irradiation chamber said substance to be irradiated by said high speed electrons after irradiation of the same; and an electrical accelerator for accelerating the velocity of the electrons to a high speed, said electrical accelerator comprising in combination a main generator including a container filled with an insulating liquid, a plurality of condensers and charging resistors arranged within said container immersed in said insulating liquid in the same, a plurality of chambers filled with compressed air, and a plurality of spark gaps arranged in said chambers filled with compressed air and having electrodes arranged at a fixed distance from each other; and a secondary generator being of smaller size than said main generator and including a plurality of condensers being smaller in size than said condensers of said main generator.

37. A device for subjecting a substance to irradiation with high speed electrons comprising in combination at least one irradiation unit provided with an electron permeable exit window for the high speed electrons created within said irradiation unit; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; an inlet opening in the wall of said irradiation chamber for introducing into said irradiation chamber said substance to be irradiated by said high speed electrons; an outlet opening in the wall of said irradiation chamber for removing from said irradiation chamber said substance to be irradiated by said high speed electrons after irradiation of the same; and an electrical accelerator for accelerating the velocity of the electrons to a high speed, said electrical accelerator including a surge generator comprising in combination a container filled with an insulating liquid, a plurality of condensers and charging resistors arranged within said container immersed in said insulating liquid within the same, a plurality of chambers filled with compressed air, a first set of spark gaps arranged within said chambers filled with compressed air and having electrodes being at a fixed distance from each other, a second set of spark gaps arranged outside of said chambers filled with compressed air, and adjustable means for regulating said second set of spark gaps, controlling thereby the voltage output of said generator.

38. A device for subjecting a substance to irradiation with high speed electrons comprising in combination at least one irradiation unit provided with an electron permeable exit window for the high speed electrons created within said irradiation unit; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; an inlet opening in the wall of said irradiation chamber for introducing into said irradiation chamber said substance to be irradiated by said high speed electrons; an outlet opening in the wall of said irradiation chamber for removing from said irradiation chamber said substance to be irradiated by said high speed electrons after irradiation of the same; and an electrical accelerator for accelerating the velocity of the electrons to a high speed, said electrical accelerator comprising in combination a main generator including a container filled with an insulating liquid, a plurality of condensers and charging resistors arranged within said container immersed in said insulating liquid in the same, a plurality of chambers filled with an insulating liquid, a plurality of spark gaps arranged in said chambers filled with an insulating liquid and having electrodes arranged at a fixed distance from each other, and a secondary generator being of smaller size than said main generator and including a plurality of condensers being each smaller in size than said condensers of said main generator.

39. A device for subjecting a substance to irradiation with high speed electrons comprising in combination an irradiation unit including electron emitting means comprising in combination a chamber, an electron emitting substance arranged at least partly at the top end of said chamber and composed of a great multitude of gossamer-like thread shaped particles, an inlet conduit for introducing a gaseous substance into said electron emitting substance, and valve means for controlling the amount of gaseous substance introduced into said electron emitting substance; an electron permeable exit window forming part of said irradiation unit permitting exit of the high speed electrons created within said irradiation unit by said electron emitting means; an electrical accelerator to accelerate the velocity of the electrons to a high speed; an irradiation chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

40. A device for subjecting a substance to irradiation with high speed electrons comprising in combination an irradiation unit including electron emitting means comprising in combination a chamber, an electron emitting substance arranged at least partly in the middle portion of said chamber and composed of a great multitude of gossamer-like thread shaped particles, a plurality of metallic needle-like wires extending between the top of said electron emitting means and said electron emitting substance; an inlet conduit for introducing a gaseous substance into said electron emitting substance, and valve means for controlling the amount of gaseous substance introduced into said electron emitting substance; an electron permeable exit window forming part of said irradiation unit permitting exit of the high speed electrons created within said irradiation unit by said electron emitting means; an electrical accelerator to accelerate the velocity of the electrons to a high speed; an irradiation chamber for said substance to be irradiated by said high speed electrons arranged outside of said irradiation unit adjacent to said exit window of the same; and an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber.

41. A device for subjecting a substance to irradiation with high speed electrons comprising in combination at least one irradiation unit provided with an electron permeable exit window for the high speed electrons created within said irradiation unit; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and an electrical accelerator for accelerating the velocity of the electrons to a high speed, said electrical accelerator comprising in combination a casing filled with oil, an impulse generator mounted within said oil filled casing and including a rectifier device, a plurality of condensers, a plurality of spark gaps and a plurality of charging resistances.

42. A device for subjecting a substance to irradiation with high speed electrons comprising in combination an irradiation unit including electron emitting means comprising in combination a chamber, an electron emitting substance arranged at least partly at the top end of said chamber and composed of a great multitude of gossamer-like thread shaped particles, an inlet conduit for introducing a gaseous substance into said electron emitting substance, and valve means for controlling the amount of gaseous substance introduced into said electron emitting substance; an electron permeable exit window forming part of said irradiation unit permitting exit of the high speed electrons created within said irradiation unit by said electron emitting means; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and an electrical accelerator for accelerating the velocity of the electrons to a high speed, said electrical accelerator including a surge generator comprising in combination a container filled with an insulating liquid, a plurality of condensers, charging resistors and a first set of spark gaps arranged within said container immersed in said insulating liquid within the same, a second set of spark gaps arranged outside of said container, and adjustable means for regulating said second set of spark gaps, controlling thereby the voltage output of said surge generator.

43. A device for subjecting a substance to irradiation with high speed electrons comprising in combination an irradiation unit including electron emitting means comprising in combination a chamber, an electron emitting substance arranged at least partly at the top end of said chamber and composed of a great multitude of gossamer-like thread shaped particles, an inlet conduit for introducing a gaseous substance into said electron emitting substance, and valve means for controlling the amount of gaseous substance introduced into said electron emitting substance; an electron permeable exit window forming part of said irradiation unit permitting exit of the high speed electrons created within said irradiation unit by said electron emitting means; an irradiation chamber for said substance to be irradiated by said high speed electrons arranged outside of said irradiation unit adjacent to said exit window of the same; an electron permeable entrance window arranged in the wall of said irradiation chamber in the path of said high speed electrons emitted by said irradiation unit through said electron permeable exit window, thus permitting entrance of said high speed electrons through said electron permeable entrance window into said irradiation chamber; and an electrical accelerator for accelerating the velocity of the electrons to a high speed, said electrical accelerator comprising in combination a main generator including a container filled with an insulating liquid, a plurality of condensers and charging resistors arranged within said container immersed in said insulating liquid in the same, a plurality of chambers filled with compressed air, and a plurality of spark gaps arranged in said chambers filled with compressed air and having electrodes arranged at a fixed distance from each other; and a secondary generator being of smaller size than said main generator and including a plurality of condensers being smaller in size than said condensers of said main generator.

ARNO A. BRASCH.

REFERENCES CITED

The following references are of record in the file of this patent:

UNITED STATES PATENTS

| Number | Name | Date |
| --- | --- | --- |
| 1,907,507 | Coolidge | May 9, 1933 |
| 1,559,714 | Lilienfeld | Nov. 3, 1925 |
| 2,007,765 | Knudson | July 9, 1935 |
| 2,144,518 | Westendorp | Jan. 17, 1939 |
| 2,145,727 | Lloyd | Jan. 31, 1939 |
| 2,254,994 | Butland | Sept. 2, 1941 |
| 2,256,191 | Von Borries | Sept. 16, 1941 |
| 1,779,402 | Rowland | Oct. 21, 1930 |
| 1,961,715 | Slack | June 5, 1934 |
| 1,971,277 | Rupp | Aug. 21, 1934 |
| 1,991,236 | Van de Graaff | Feb. 12, 1935 |
| 2,018,599 | Brasch | Oct. 22, 1935 |
| 2,043,733 | Brasch | June 9, 1936 |
| 2,161,985 | Szilard | June 13, 1939 |
| 2,206,710 | Tonks | July 2, 1940 |

FOREIGN PATENTS

| Number | Country | Date |
| --- | --- | --- |
| 532,773 | Germany | Sept. 2, 1931 |